United States Patent [19]
Shelly

[11] 3,891,235
[45] June 24, 1975

[54] BICYCLE WHEEL DRIVE
[75] Inventor: Jacques Shelly, Venice, Calif.
[73] Assignee: James De Cordova, Santa Monica, Calif.
[22] Filed: July 2, 1974
[21] Appl. No.: 485,297

[52] U.S. Cl................................. 280/252; 280/241
[51] Int. Cl.² ....................... B62M 1/04; B62M 9/02
[58] Field of Search............................ 280/252, 251

[56] References Cited
UNITED STATES PATENTS
661,630  11/1900  Allen ................................. 280/252
FOREIGN PATENTS OR APPLICATIONS
3,288  1910  United Kingdom................ 280/252

Primary Examiner—Leo Friaglia
Attorney, Agent, or Firm—Ralph B. Pastoriza

[57] ABSTRACT

The rear wheel of a bicycle is provided with left and right sprockets and cooperating left and right ratchets so that rotation of either sprocket in one direction will rotate the rear wheel in a like direction and rotation of any one sprocket in an opposite direction will not affect the rear wheel. Upper and lower pairs of pedal sprockets in turn are mounted on the frame each pair comprising a left and right pedal sprocket on opposite sides of the frame. The drive is completed by left and right bicycle chains which pass over the upper and lower left sprockets and rear wheel left sprocket and over the upper and lower right sprockets and rear wheel right sprocket. The upper and lower pairs of pedal sprockets are in substantial vertical alignment and left and right pedals are affixed to the chains respectively so that they may be alternately moved up and down by a bicycle rider to thereby operate the left and right rear ratchets and propel the bicycle forwardly.

3 Claims, 7 Drawing Figures

BICYCLE WHEEL DRIVE

This invention relates to bicycles and more particularly to an improved rear wheel drive and pedal system for a bicycle.

BACKGROUND OF THE INVENTION

Conventional bicycles are driven by a rear wheel sprocket coupled by a chain to a single forward sprocket in turn rotated by left and right pedals. With this arrangement each leg of the bicycle rider follows a circular path in driving the bicycle forwardly. As a consequence, there is a varying torque applied to the rear wheel sprocket as the rider's foot passes over top dead center and swings downwardly in an arc towards bottom dead center. It is clear that there is no contribution of driving force when the pedal is at its top or bottom dead center and thus pedal motion close to these points is essentially wasted.

In view of the foregoing, it has been proposed to provide a pedal arrangement wherein the pedals move in rectilinear vertical paths so that force is applied during the full stroke of either pedal from a top to a bottom position. Such arrangements overcome the above noted varying torque problem but on the other hand have unduly complicated bicycle construction as well as added substantial weight to the driving mechanism.

BRIEF DESCRIPTION OF THE PRESENT INVENTION

The present invention contemplates an improved rear wheel drive and pedaling arrangement wherein the bicycle pedals are moved in substantially vertical rectilinear paths as opposed to a rotary type motion for driving the rear wheel all in a manner which avoids unduly complicated driving systems and the attendant substantial increase in weight.

More particularly, in accord with the present invention there is provided a wheel drive for a bicycle having a frame rotatably supporting the axles of front and rear bicycle wheels which comprises left and right ratchet means on either side of the rear wheel connecting to opposite ends of the rear axle such that rotation of either ratchet means in one direction rotates the rear wheel in a like direction, rotation of the ratchet means in an opposite direction not affecting the wheel.

Left and right pedals are coupled to the frame for alternate up and down movement along a rectilinear generally vertical path. Left and right coupling means on the frame are respectively coupled to the left and right pedals for rotation in response to downward movement of an associated pedal. Left and right transmission means in turn connect between the left and right ratchet means and the left and right coupling means respectively for transferring the rotary motion of the coupling means to the ratchet means so that the rear wheel is driven in the one direction upon downward movement of a pedal to thereby propel the bicycle forwardly.

In the preferred embodiment of the invention, the left and right coupling means take the form of upper and lower pairs of sprockets, each including a left and right sprocket on either side of the frame. The left and right transmission means in turn comprise left and right bicycle chains coupling the upper and lower left pedal sprockets to the left ratchet means and the upper and lower right pedal sprockets to the right ratchet means respectively.

BRIEF DESCRIPTION OF THE DRAWINGS

A better understanding of the invention will be had by now referring to the accompanying drawings in which.

Figure 1:
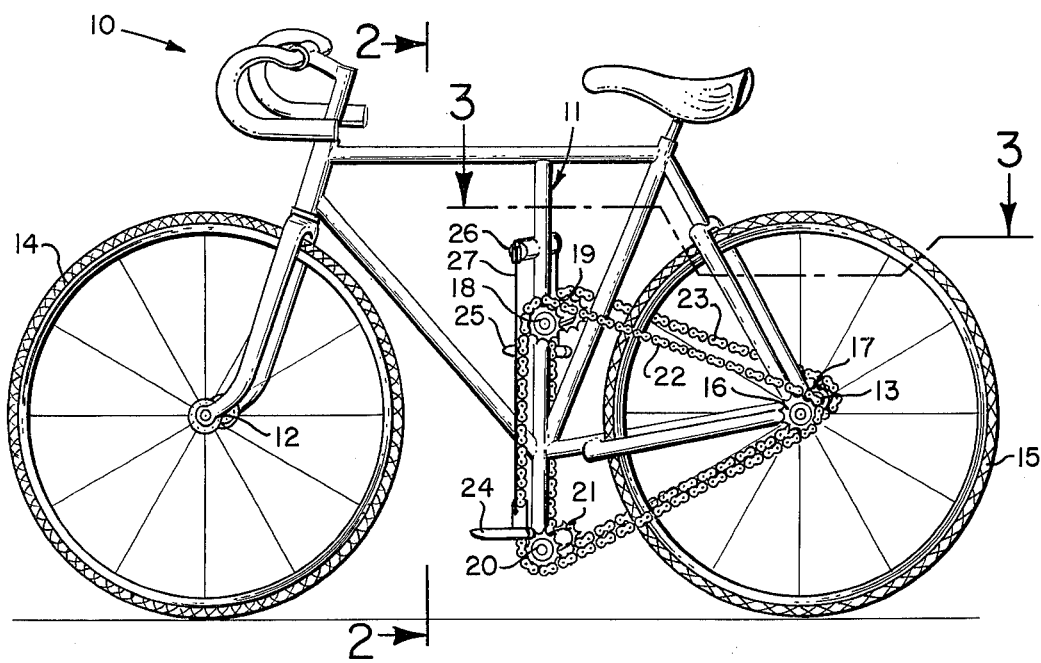
FIG. 1 is a side elevational view slightly in perspective showing the improved rear wheel and pedal driving system of the invention.

Referring first to FIG. 1, there is shown a bicycle 10 having a frame 11 rotatably supporting the front and rear axles 12 and 13 of front and rear bicycle wheels 14 and 15.

In accord with the present invention, left and right rear wheel sprockets 16 and 17 are rotatably mounted on the frame on either side of the rear wheel 15. As will become clearer as the description proceeds, these left and right sprockets 16 and 17 cooperate with left and right ratchet means coupling the sprockets to opposite ends of the rear wheel axle 13 such that rotation of either one of the sprockets in a first direction (for example, counterclockwise as viewed in FIG. 1) drives the rear wheel in a like direction and rotation of either one of the sprockets in a second opposite direction results in a decoupling of the ratchet means associated with the particular sprocket rotated in said opposite direction so that said wheel is unaffected by the particular sprocket.

Referring to the central portion of FIG. 1, there are provided upper and lower pairs of pedal sprockets each comprising individually rotatable left and right pedal sprockets 18 and 19, comprising the upper pair and 20 and 21 comprising the lower pair. As shown, the upper and lower pairs are in substantial vertical alignment being mounted at upper and lower portions of the frame 11 as shown.

Still referring to FIG. 1, there are shown left and right bicycle chains 22 and 23 passing respectively over the upper and lower left pedal sprockets 18 and 20 and left rear wheel sprocket 16 and over the right upper and lower pedal sprockets 19 and 21 and rear wheel sprocket 17. Left and right pedals 24 and 25 are shown coupled to intermediate portions of the left and right chains 22 and 23 between the upper and lower pairs of pedal sprockets.

With the foregoing arrangement, it will be appreciated that a downward driving force alternately exerted on the pedals by a bicycle rider will drive the rear wheel of the bicycle in the referred to first direction to propel the bicycle forwardly.

In order that the relative relationships of the pedals 24 and 25 will remain 180° out of phase, these pedals are coupled together as by a pulley means 26 shown secured to the upper portion of the frame adjacent to the upper pair of pedal sprockets 18 and 19 and a cable 27 connected at one end to the pedal 24 and passing up over the pulley means 26 and thence downwardly to connect at its other end to the right pedal 25. With this arrangement, when the left pedal is moved downwardly, the right pedal will be raised, and when the right pedal is moved downwardly, the left pedal will be raised.

Figure 2:
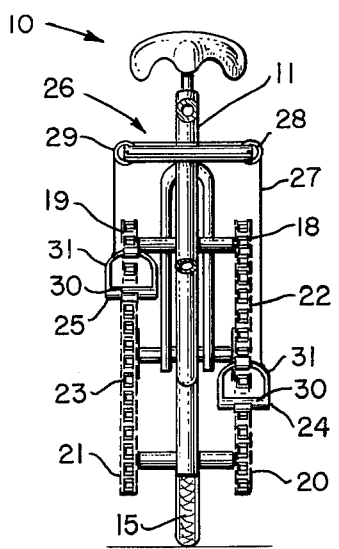
FIG. 2 is a front elevation of the drive mechanism taken in the direction of the arrows 2—2 of FIG. 1.

The foregoing described arrangement can be better understood by now referring to FIG. 2 wherein the disposition of the upper and lower pairs of pedal sprockets 18, 19 and 20, 21 on either side of the bicycle frame 11 is clearly shown. Further, the pulley means 26 itself is illustrated in further detail as comprising left and right pulleys 28 and 29 mounted to the frame 11 in positions vertically above the left and right sprockets of the upper pair respectively.

In the embodiment of FIGS. 1 and 2, the left and right pedals 24 and 25 take the form of stirrups comprised for example of a foot step 30 and upper bow member 31 for the left pedal 24 and similarly a foot step 32 and upper bow member 33 for the right pedal 25. The associated chain in turn has its ends connected to the central portion of the upper bow member and the under central portion of the foot step respectively so that the downward force vector exerted on the pedal is in alignment with the associated chain portion extending between the associated upper and lower pedal sprockets. This disposition of the pedals will avoid side force components when a bicycle rider exerts downward force on the pedal which side force components would tend to move the vertical chain portions inwardly towards the central frame as viewed in FIG. 2.

Figure 3:
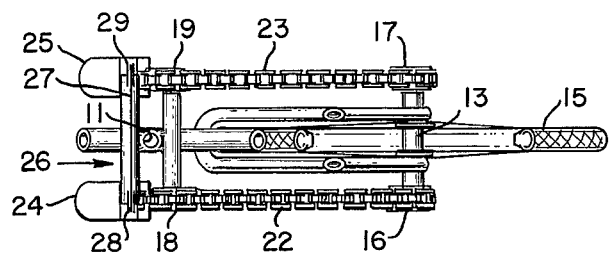
FIG. 3 is a top plan view of the drive system taken in the direction of the arrows 3—3 of FIG. 1.

FIG. 3 shows the arrangement of FIGS. 1 and 2 in plan view wherein the same numerals have been used to designate corresponding components. Thus, the left and right chains 22 and 23 are shown connecting the left and right upper pedal sprockets 18 and 19 to the left and right rear wheel sprockets 16 and 17. The stirrup like pedals 24 and 25 are also illustrated together with the pulley means 26 and cooperating cable 27 to maintain the out-of-phase relationship of the pedals during reciprocating up and down movement.

Figure 4:
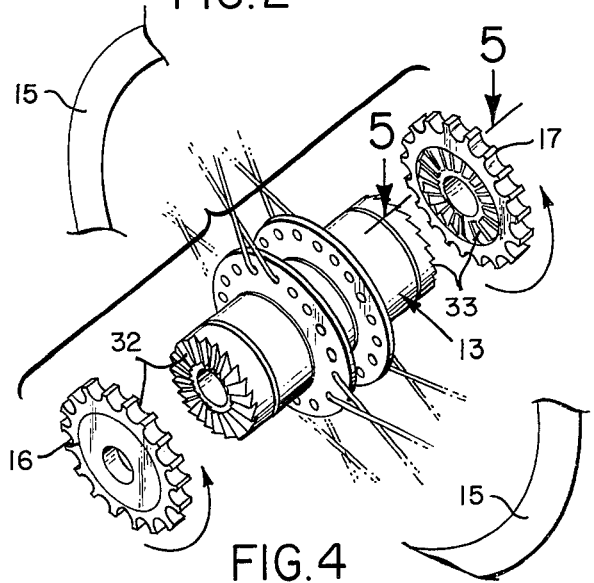
FIG. 4 is an exploded perspective view of basic components making up left and right ratchets for driving the rear wheel.
Figure 5:
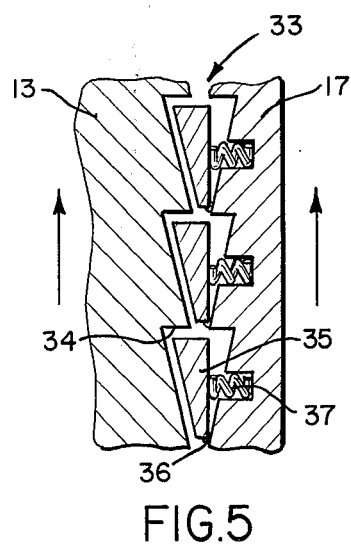
FIG. 5 is an enlarged fragmentary cross section taken in the direction of the arrows 5—5 of FIG. 4 when the components are assembled.

Referring now to FIGS. 4 and 5, details of the left and right ratchet means referred to in FIG. 1 for coupling the left and right sprockets 16 and 17 to the opposite ends of the rear wheel axle 13 will be described.

Referring first to the exploded view of FIG. 4, the left and right ratchet means are designated by the numerals 32 and 33 respectively and essentially take the form of ratchet elements formed on the inside surfaces of the left and right sprockets 16 and 17 cooperating with ratchet detents on the rear wheel axle 13. When the components are assembled, and a section is viewed as along the section lines 5—5 of FIG. 4, the cooperation of the ratchet elements and detents is illustrated in FIG. 5.

As shown, by way of example of only one type of ratchet means, the ratchet indents for one end of the axle 13 are shown at 34 and the ratchet elements on the inside of the associated sprocket 17 are shown in the form of pawls 35 individually pivoted as at 36 and spring biased towards the detents 34 as by small springs 37.

It will be appreciated that when the sprocket 17 is rotated so that the peripheral sectional portion viewed in FIG. 5 is moving in the direction of the arrow, the axle 13 will be driven in the same direction as a consequence of the pawls 37 being received in the ratchet indents 34. On the other hand, when the sprocket 17 is rotated in an opposite direction, the pawls 35 will simply ride out or become disengaged from the indents 34 so that the rotation of the rear wheel axle 13 will be unaffected and thus rotation of the rear wheel 15 itself is unaffected.

It will be appreciated that the left ratchet means 32 of FIG. 4 cooperating with the left sprocket 16 is similarly constructed (the indents and ratchet pawls being mirror images of those described for the right sprocket 17 and right end of the axle 13) so that a detailed description of the left ratchet means need not be set forth.

Figure 6:
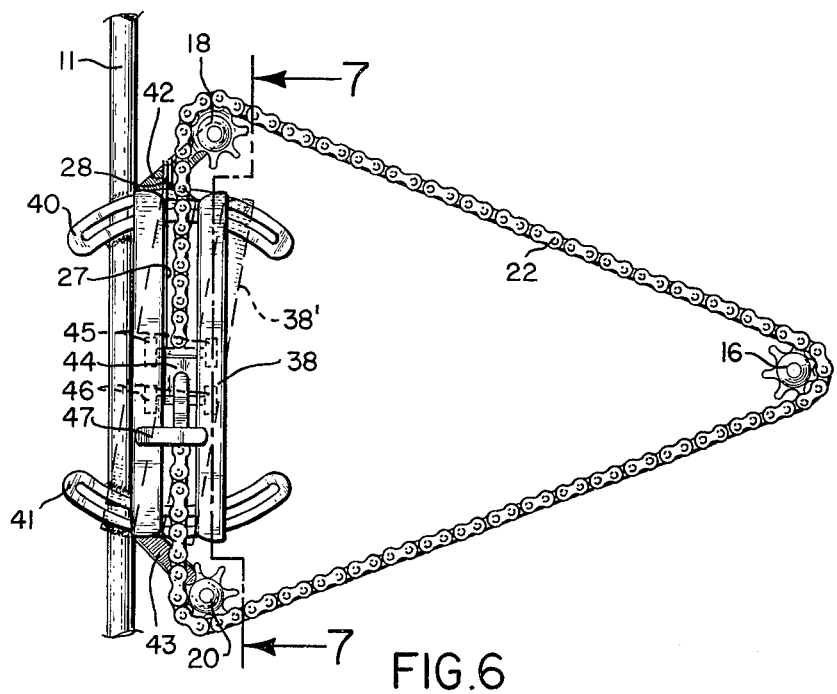
FIG. 6 is a fragmentary side elevational view showing additional features in accord with the invention; and, FIG. 7 is a rear view looking in the direction of the arrows 7—7 of FIG. 6.
Figure 7:
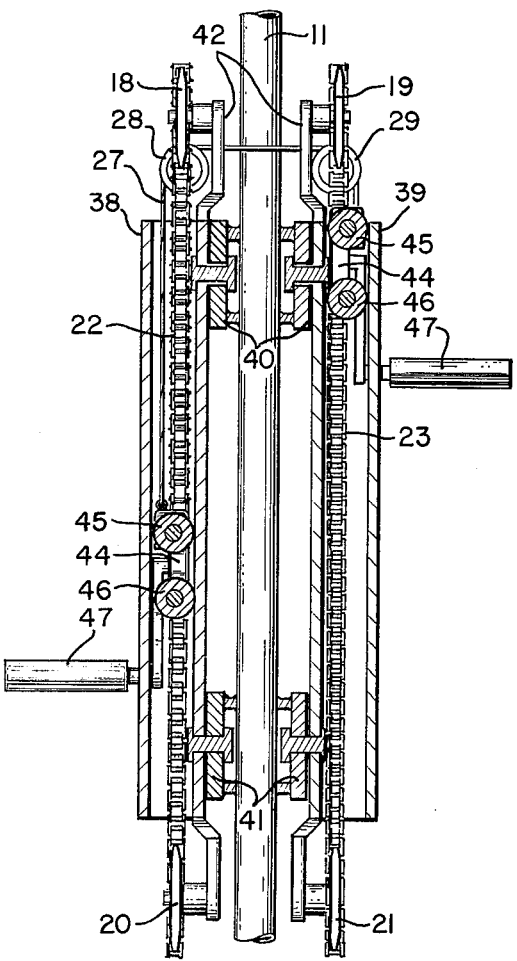

Referring now to FIGS. 6 and 7, there is shown a modifed construction providing certain additional advantages in the drive system. It will be recalled with respect to the embodiment of FIGS. 1 and 2 that the pedals took the form of stirrups such that the force vector exerted on the pedal would be in alignment with the chain and thus prevent the generation of side components which would tend to move the chain laterally. While the stirrups described would solve this problem, there can still result inconvenient interference with the chain by the upper portion of the bicycle rider's foot and knees. Thus, it would be desirable to have the pedals extend laterally from the chain portions to which they are connected so that when a bicycle rider's feet are positioned on the pedals, his leg portions are free of interference with the remaining mechanism.

Having the pedals laterally extend from the chain portions however would normally result in an undesirable inward movement of the chain upon exerting a downward force on the off center pedal. To avoid this problem, and as illustrated in FIGS. 6 and 7, there are provided left and right generally vertically disposed guide means 38 and 39 coupled to the frame 11, preferably by an adjustable mounting means in the form of upper and lower arcuate curved brackets 40 and 41 provided with arcuate slots to which the upper and lower ends of the guide means in the form of channels can be secured. Thus, as indicated by the phantom lines in FIG. 6, this mounting means for the guide channels 38 and 39 permits tilting movement slightly should it be desired to vary the rectilinear direction of motion of the pedals slightly from the vertical. It will be appreciated, of course, that in the arrangement shown in FIG. 6, the upper and lower pairs of sprockets the left ones of which are illustrated at 18 and 19, would be mounted to the guide channels 38 and 39 respectively so that their relative positions to the channel guides would not change.

As shown in FIG. 6, the chain portions to which the pedals are coupled pass within the guide means 38 and 39.

FIG. 7 illustrates more clearly the manner in which the pedals are coupled to the chains. Since the left and right guide means 38 and 39 are essentially identical, a detailed description of one will suffice for both. Thus, referring first to the left guide means 38, as described, this structure is in the form of a channel having upper and lower open ends through which the chain 22 passes. Disposed within the channel is a carriage 44 having upper and lower bearings or rollers 45 and 46 which engage opposite walls of the channel. The channel itself is provided with a front slot as clearly shown in FIG. 6, and the modified pedal 47 itself connects to the carriage 44 through the slot as shown in FIG. 7.

With the foregoing arrangement, it will be appreciated that downward force on the pedal 47 will tend to tilt the carriage 44 within the channel guide means 38 but because of the constraining engagement by the rollers 45 and 46 respectively, the pedal 47 will be retained in its horizontal level position and further the movement of the chain 22 will be constrained to a substantially vertical rectilinear path.

OPERATION

In operating the bicycle described, the bicycle rider will simply alternately exert downward pressure on the pedals to thereby alternately drive the ratchet means coupled to the associated chain thereby propelling the bicycle forwardly. The advantages of this type of drive have already been set forth basically and these advantages as stated are known in the prior art. However, with the simplified construction of the present invention, the desired up and down movement of the pedals is accomplished without substantially increasing the overall weight of the bicycle. Further, the arrangement as described in conjunction with FIGS. 6 and 7 permits the actual rectilinear path to be tilted slightly with respect to the vertical, this adjustment permitting a particular bicycle to be adapted to a particular rider.

Another important advantage of the present construction resides in the fact that, on the average, a "balance" of the driving of the rear wheel takes place. In this respect, in prior art conventional bicycles using rotary pedals as well as those prior art bicycles proposed wherein an up and down motion of the pedals takes place, the drive to the rear wheel is necessarily along one side of the frame; that is, it is off from the center line or center of gravity of the bicycle. This off center arrangement is necessary in prior art bicycles since there is ordinarily provided a front and rear sprocket and mounting of the sprockets for cooperation with a bicycle chain must necessarily be to one side of the frame in order to avoid interference with the frame. An exact central alignment would not be possible without splitting the frame and rear wheel in two. As a consequence, there is a slight tendency when pumping the bicycle to cause it to tilt more to one side than the other. This slight bias is, of course, overcome by the momentum of the bicycle and the bicycle rider's ability to compensate by his handlebar steering mechanism as well as by his weight distribution relative to the center line of the bicycle.

On the other hand, with applicant's dual chain arrangement, the bias shifts equally from one side of the bicycle to the other as each pedal is respectively forced downwardly so that pedaling at high speeds, the average bias cancels out and is along the exact center line of the bicycle.

In addition to the foregoing features, it will be understood that the stroke of the pedals is not confined to any specific value. Thus, a rider could alternate with various short strokes or could use the full stroke of each pedal. This advantage is in part a consequence of utilizing left and right rear ratchet means for driving the rear wheel.

It should be understood that while the left and right bicycle chains 22 and 23 are shown as complete chain structures over their entire length, it is actually only necessary that the portion of the chain engaging the left or right rear wheel sprocket be of a chain construction to drive the sprocket, the remaining portion which reciprocates up and down between the upper and lower pedal sprockets not requiring an actual chain construction. In other words, the latter portions could be a cable and upper and lower sprockets could be replaced by simple rollers.

From the foregoing description, it will thus be evident that Applicant has provided a greatly improved bicycle wheel drive wherein all of the advantages of straight up and down pedal motion can be realized without appreciably complicating the drive mechanism.

What is claimed is:

1. A wheel drive for a bicycle having a frame rotatably supporting the axles of front and rear bicycle wheels, including, in combination:
   a. left and right rear wheel sprockets on either side of the rear wheel rotatably mounted to said frame;
   b. left and right ratchet means coupling said sprockets to opposite ends respectively of the rear wheel axle such that rotation of either one of said sprockets in a first direction drives the rear wheel in a like direction and rotation of either one of the sprockets in a second opposite direction results in a decoupling of the ratchet means associated with the particular sprocket rotated in said opposite direction so that said wheel is unaffected by said particular sprocket;
   c. upper and lower pairs of pedal sprockets each comprising individually rotatable left and right pedal sprockets on either side of said frame rotatably mounted at upper and lower portions of said frame respectively, said pairs being in substantial vertical alignment;
   d. left and right bicycle chains passing respectively over the left upper and lower pedal sprockets and left rear wheel sprocket and over the right upper and lower pedal sprockets and right rear wheel sprocket;
   e. left and right pedals respectively coupled to intermediate portions of said left and right chains between the upper and lower pairs of pedal sprockets, whereby a downward driving force alternately exerted on said pedals by a bicycle rider will drive the rear wheel of said bicycle in said first direction to propel said bicycle forwardly;
   f. left and right generally vertically disposed guide means coupled to said frame, the chain portion to which said pedals are coupled passing within said guide means such that the pedals are constrained to move in rectilinear paths, said guide means supporting said upper and lower pairs of pedal sprockets; and
   g. mounting means for coupling said guide means to said frame for tilting movement fore or aft whereby the direction of rectilinear motion of the pedals can be altered slightly from a vertical direction.

2. The subject matter of claim 1, including pulley means secured to the upper portion of said frame adjacent to said upper pair of pedal sprockets; and a cable connected at one end to the left pedal and passing up over said pulley means thence downwardly to connect at its other end to the right pedal so that downward movement of the left pedal raises the right pedal and downward of the movement of the right pedal raises the left pedal.

3. The subject matter of claim 1, in which each of said pedals is in the form of a stirrup having a foot step and upper bow member, the associated chain having its ends connected to the central portion of said upper bow member and the under central portion of the foot step respectively so that the downward force vector exerted on the pedal is in alignment with the associated chain portion extending between the associated upper and lower pedal sprockets.

* * * * *